United States Patent
Huang et al.

(10) Patent No.: US 8,843,473 B2
(45) Date of Patent: Sep. 23, 2014

(54) METHOD AND SERVER FOR HANDLING DATABASE QUERIES

(75) Inventors: Vincent Huang, Sollentuna (SE); Simon Moritz, Stockholm (SE); Xianwei Shen, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 43 days.

(21) Appl. No.: 13/704,101

(22) PCT Filed: Jun. 21, 2010

(86) PCT No.: PCT/SE2010/050702
§ 371 (c)(1),
(2), (4) Date: Dec. 13, 2012

(87) PCT Pub. No.: WO2011/162645
PCT Pub. Date: Dec. 29, 2011

(65) Prior Publication Data
US 2013/0091119 A1    Apr. 11, 2013

(51) Int. Cl.
*G06F 17/30* (2006.01)

(52) U.S. Cl.
USPC .......................................................... 707/713

(58) Field of Classification Search
CPC ................... G06F 17/30442; G06F 17/30448; G06F 17/30451
USPC .......................................................... 707/713
See application file for complete search history.

(56) References Cited

U.S. PATENT DOCUMENTS

| | | | |
|---|---|---|---|
| 5,590,319 A * | 12/1996 | Cohen et al. ........................... 1/1 |
| 7,363,289 B2 | 4/2008 | Chaudhuri et al. |
| 7,539,667 B2 * | 5/2009 | Lindsay et al. ........................ 1/1 |
| 2004/0243595 A1 * | 12/2004 | Cui et al. ........................ 707/100 |
| 2006/0101011 A1 * | 5/2006 | Lindsay et al. .................... 707/4 |
| 2007/0282900 A1 * | 12/2007 | Owens et al. ............... 707/104.1 |
| 2008/0010240 A1 | 1/2008 | Zait |
| 2008/0040334 A1 * | 2/2008 | Haber et al. ....................... 707/4 |
| 2009/0106219 A1 | 4/2009 | Belknap et al. |
| 2009/0119572 A1 * | 5/2009 | Koivunen ..................... 715/206 |

(Continued)

OTHER PUBLICATIONS

"Scalable Join Processing on Very Large RDF Graphs", Neumann et al., ACM, Jul. 2, 2009.*

(Continued)

*Primary Examiner* — Jean M Corrielus
(74) *Attorney, Agent, or Firm* — Coats & Bennett, P.L.L.C.

(57) ABSTRACT

A method and a server (300) for handling database queries directed to a semantic database (302) with stored information according to a preset ontology structure and annotated as element identifiers comprising triplets with a subject, a predicate and an object. In the server (300), a data analyser (300a) collects statistics from the database and defines semantic rules from the information in the database. When a database query is received with a first set of sub-queries, a query optimiser (300c) rewrites the query as a second set of sub-queries in the triplet format based on any of the ontology structure, the collected statistics and the defined rules. A Reduction Rate RR is also calculated for the sub-queries relating to the number of distinct subjects and objects appearing in the database with the predicates of the sub-queries. The sub-queries of the second set are finally provided as a modified query in an order according to decreasing Reduction Rates for execution in that order when searching the database.

13 Claims, 5 Drawing Sheets

(56) References Cited

U.S. PATENT DOCUMENTS

| | | | |
|---|---|---|---|
| 2009/0138437 A1* | 5/2009 | Krishnamoorthy et al. | 707/3 |
| 2009/0271385 A1* | 10/2009 | Krishnamoorthy et al. | 707/4 |
| 2010/0268596 A1* | 10/2010 | Wissner et al. | 705/14.49 |
| 2010/0268700 A1* | 10/2010 | Wissner et al. | 707/706 |
| 2013/0166303 A1* | 6/2013 | Chang et al. | 704/258 |
| 2013/0204876 A1* | 8/2013 | Szucs et al. | 707/738 |
| 2013/0246430 A1* | 9/2013 | Szucs et al. | 707/738 |

OTHER PUBLICATIONS

"Matrix Bit loaded A Scalable Lightweight Join Query Processor for RDF Data", Atre et al., ACM, Apr. 26-30, 2010.*

"The RDF-3X engine for scalable management of RDF data", Neumann et al., Springer-Verlag 2009.*

"Towards Benefit-Based RDF Source Selection for SPARQL Queries", et al., Hose et al., ACM 2012.*

"SPOVC : A scalable RDF store using horizontal partitioning and column oriented DBMS", Mulay et al., ACM, Jun. 2005.*

Stocker, M. et al. "SPARQL Basic Graph Pattern Optimization Using Selectivity Estimation." WWW 2008/Refereed Track: Semantic/Data Web—Semantic Web II, Apr. 21-25, 2008, Beijing, China, pp. 595-604.

Swami, A. "Optimization of Large Join Queries: Combining Heuristics and Combinatorial Techniques." SIGMOD '89 Proceedings of the 1989 ACM SIGMOD International Conference on Management of Data, ACM SIGMOD Record, vol. 18, Issue 2, Jun. 1989, pp. 367-376.

Cohen, W. "Fast Effective Rule Induction." Machine Learning: Proceedings of the Twelfth International Conference on Machine Learning, Tahoe City, California, Jul. 9-12, 1995, pp. 1-10.

Krishnamurthy, R. et al. "Optimization of Nonrecursive Queries." Proceedings of the Twelfth International Conference on Very Large Data Bases, Kyoto, Aug. 1986, pp. 128-137.

Bernstein, a. et al. "OptARQ: A SPARQL Optimization Approach based on Triple Pattern Selectivity Estimation." Technical Report No. ifi-2007.03, Mar. 2, 2007, pp. 1-18.

Ahad, R. et al. "On Estimating the Cardinality of the Projection of a Database Relation." ACM Transactions on Databases, vol. 14, No. 1, Mar. 1989, pp. 28-40.

* cited by examiner

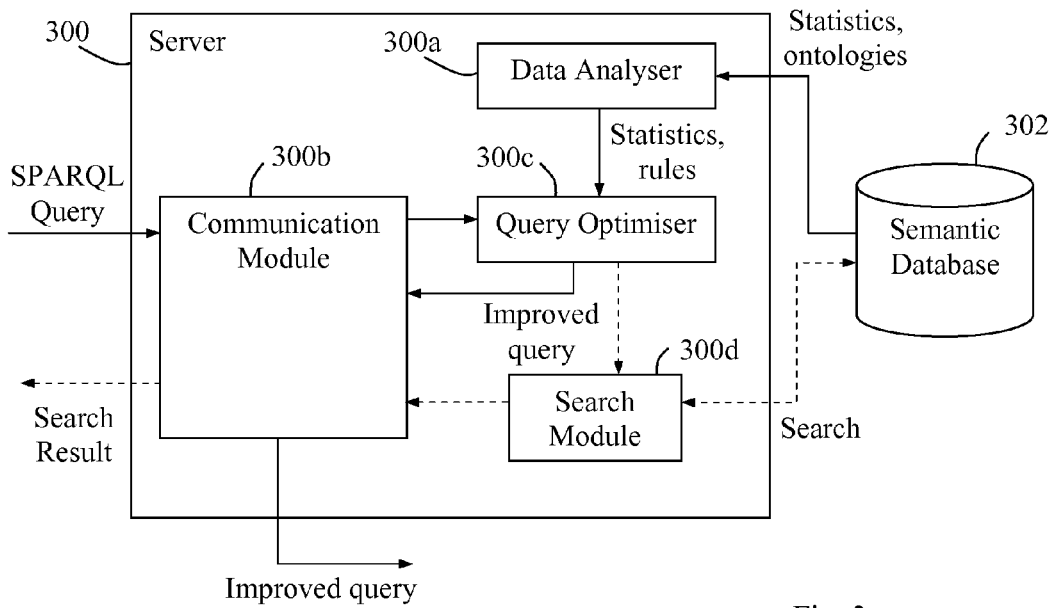
Fig. 3
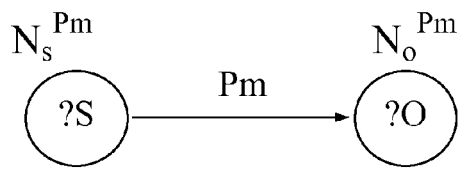
Fig. 4
| Predicate | $N_s^{Pm}$ | $N_o^{Pm}$ |
|---|---|---|
| P1 | | |
| P2 | | |
| ... | | |
| PM | | |
Fig. 5

| Triplet ID | Sub-queries | $N_s^{Pm}$ | $N_o^{Pm}$ | RR |
|---|---|---|---|---|
| T1 | ?A – P1 – ?U | 1556 | 943 | 1,0 |
| T2 | ?A – P2 – ?G | 2987 | 37 | 0,52 |
| T3 | ?A – P3 – ?C | 2731 | 3675 | 0,57 |
| T4 | ?U – P4 – ?B | 943 | 943 | 1,0 |
| T5 | ?U – P5 – ?R | 943 | 111968 | 1,0 |
| T6 | ?R – P6 – ?A | 111968 | 3051 | 0,51 |
| T7 | ?G – P7 – ?N | 47 | 42 | 0,79 |
| T8 | ?C – P8 – ?L | 3675 | 3675 | 1,0 |

| Variable ID | MUB |
|---|---|
| A | 1556 |
| G | 37 |
| C | 3675 |
| U | 943 |
| B | 943 |
| R | 111968 |
| N | 42 |
| L | 3675 |

METHOD AND SERVER FOR HANDLING DATABASE QUERIES

TECHNICAL FIELD

The invention relates to a method and a server for handling database queries with efficient search and retrieval of data in a semantic database.

BACKGROUND

When large amounts of data are to be stored in a database for different resources, it is useful to organize the data in a way that can facilitate search and retrieval of relevant data when receiving data queries or requests referring to particular resources, either generic or specific. The stored data may relate to any type of information that can be arranged logically in different classes or categories. The term "resource" is used throughout this description, although other terms could also be used such as items, assets, entities, etc. Some practical examples of resources occurring in ordinary databases are inventory items, product for sale, pieces of equipment, humans, media items, telecommunication subscribers, etc.

A plurality of attributes are typically relevant for each resource, and data referring to such attributes is stored in the database available for retrieval in response to data queries related to particular resources or classes. In practice, the data in a conventional database is often organised in a hierarchical structure where different attributes typically form columns in one or more interrelated tables in the database. In this description, the term "attribute" represents any aspect or characteristic relevant for describing a resource. Today, relational databases are typically used for holding data organized in the above class-based hierarchical manner, such as SQL (Structured Query language) databases.

In recent years, it has become increasingly interesting and useful to store information in a database in a way that allows for automatic machine-processing in a logical sense, such as interpreting and analysing the information in order to draw conclusions and infer new knowledge therefrom. This possibility may be useful, e.g., for creating and offering context-aware services which can be adapted to the consumer's current situation based on information in the database.

To enable uniform handling of information from multiple "heterogeneous" information sources, i.e. different databases, semantic annotation can be employed for different elements in the database information which can easily be identified and analysed logically by a "machine", i.e. using software executed by a processor or computer. A concept called "RDF" (Resource Description Framework) is typically used as a language for representing various pieces of information in databases regarding resources by means of semantic annotation.

Some problems associated with the typically huge databases of today are that great amounts of stored data must be searched in order to retrieve relevant information in response to database queries referring to particular resources, which is both time consuming and process intensive, often referred to as the searching "cost". In conventional relational databases, various solutions have been proposed for reducing the amount of data to search, referred to as the "search space", in response to database queries, although no efficient or relatively useful technique has been proposed to reduce the searching cost specifically for semantic databases.

U.S. Pat. No. 7,363,289 B2 discloses how a user query, made to a relational database with hierarchically arranged tables, can be evaluated by means of a query optimiser. In this solution, the query optimiser generates a query execution plan for the user query based on statistical information maintained for intermediate query component, in order to search different relevant tables in a sequence order that minimises the search cost. In this document, the query execution plan is closely related to the hierarchical nature of the relational database which cannot be applied to a semantic database having the above-described "flat" ontology framework.

SUMMARY

It is an object of the invention to address at least some of the problems and issues outlined above. For example, it is an object to provide a solution for handling database queries directed to a semantic database, that can be used to reduce the searching cost by avoiding undue processing delays and load for searching the database in an efficient manner. It is possible to achieve these objects and others by using a method and a server as defined in the attached independent claims.

According to one aspect, a method is provided in a server for handling a database query directed to a semantic database with stored information according to a preset ontology structure and annotated as element identifiers comprising triplet with a subject, a predicate and an object. This method comprises collecting statistics derived from the information in the database, and defining semantic rules relating to conclusions implied by the information in the database. When a database query forming a first set of sub-queries is received, the server rewrites the received database query as a second set of sub-queries in the triplet format based on at least one of the ontology structure, the collected statistics and the defined rules.

The server then calculates a Reduction Rate RR for the sub-queries of the second set based on the collected statistics, the Reduction Rate relating to the number of distinct subjects and objects appearing in triplet in the database with predicates corresponding to the sub-queries, and provides the sub-queries of the second set as a modified query in an order at least partly according to decreasing Reduction Rates of the sub-queries, for execution in that order when searching the database. Thereby, the incoming search query can be handled in an efficient manner to reduce the search cost by modifying and hopefully improving the search query in the manner described above.

The above method may be configured and implemented according to different embodiment. For example, the received database query may have a format according to SPARQL and the sub-queries of the first and second sets may be defined in terms of "SELECT-WHERE" clauses. This is an advantage since an existing query language can be used in this solution.

In one embodiment, collecting the statistics comprises determining the number $N_S^P$ of distinct subjects S appearing in triplet with a predicate P, and further determining the number $N_O^P$ of distinct objects O appearing in triplet with the predicate P. The determining of $N_S^P$ and $N_O^P$ is performed for individual unique predicates P1, P2, ... PM appearing in the database, by executing predefined queries with the unique predicates in the database and variable subjects and objects. This collected statistics can then be used for modifying any incoming search query to hopefully improve the search efficiency.

In another embodiment, the Reduction Rate RR is calculated for a sub-query of the second set with a predicate Pm as:

$$RR_{P_m} = \frac{MUB(V_s)}{N_S^{P_m}} \frac{MUB(V_o)}{N_O^{P_m}} \quad (1)$$

where MUB($V_S$) is a Minimum Upper Bound for the subject variable $V_S$ in the sub-query, MUB($V_O$) is a Minimum Upper Pound for the object variable $V_O$ in the sub-query, $N_S^{Pm}$ the number of distinct subjects S appearing in triplets with the predicate Pm, and $N_O^{Pm}$ is the number of distinct objects O appearing in triplets with the predicate Pm.

In another embodiment, the Minimum Upper Bound for the subject variable is determined as the minimum value of the statistics collected for the subject variable and the Minimum Upper Pound for the object variable is determined as the minimum value of the statistics collected for the object variable, and the Minimum Upper Bound is determined for basically all variables appearing in the sub-queries of the second set. In this way, the sub-queries of the second set can be executed in an efficient order.

In another embodiment, the order of sub-queries of the second set dictates that the sub-query having the greatest RR value of all is executed first, the sub-query having the next greatest RR value is executed next, and so forth.

According to another aspect, a server is provided that is configured to handle a database query directed to a semantic database with stored information according to a preset ontology structure and annotated as element identifiers comprising triplets with a subject, a predicate and an object. The server comprises a data analyser adapted to collect statistics derived from the information in the database, and to define semantic rules relating to conclusions implied by the information in the database. The server also comprises a communication module adapted to receive a database query forming a first set of sub-queries, and a query optimiser.

The query optimiser is adapted to rewrite the received database query as a second set of sub-queries in the triplet format based on at least one of: the ontology structure the collected statistics and the defined rules, and to calculate a Reduction Rate RR for the sub-queries in the second set based on the statistics collected in the data analyser, the Reduction Rate relating to the number of distinct subjects and objects appearing in triplet in the database with predicates corresponding to the sub-queries. The query optimiser is further adapted to provide the sub-queries of the second set as a modified query in an order at least partly according to decreasing Reduction Rates of the sub-queries, for execution in that order when searching the database. Thereby, the server can be used to handle the incoming search query in an efficient manner to reduce the search cost by modifying and hopefully improving the search query.

The above server may be configured and implemented according to different embodiments. In one embodiment, the server further comprises a search module adapted to perform a search by executing the sub-queries of the second set in the database, wherein the communication module is further adapted to return a response with results from the search.

In another embodiment, the data analyser is further adapted to collect the statistics by determining the number $N_S^P$ of distinct subjects S appearing in triplet with a predicate P, and by determining the number $N_O^P$ of distinct objects O appearing in triplets with the predicate P. The data analyser may be further adapted to perform the determining of $N_S^P$ and $N_O^P$ for individual unique predicates P1, P2, ... PM appearing in the database, by executing predefined queries with the unique predicates in the database and variable subjects and objects.

In another embodiment, the query optimiser is further adapted to calculate the Reduction Rate RR for a sub-query of the second set with a predicate Pm as:

$$RR_{P_m} = \frac{MUB(V_s)}{N_S^{P_m}} \frac{MUB(V_o)}{N_O^{P_m}}$$

where MUB($V_S$) is a Minimum Upper Bound for the subject variable $V_S$ in the sub-query, MUB($V_O$) is a Minimum Upper Pound for the object variable $V_O$ in the sub-query, $N_S^{Pm}$ is the number of distinct subjects S appearing in triplet with the predicate Pm, and $N_O^{Pm}$ is the number of distinct objects O appearing in triplets with the predicate Pm.

In another embodiment, the query optimiser is further adapted to determine the Minimum Upper Bound for the subject variable as the minimum value of the statistics collected for the subject variable, to determine the Minimum Upper Bound for the object variable as the minimum value of the statistics collected for the object variable, and to determine the Minimum Upper Bound for basically all variables appearing in the sub-queries of the second set.

In another embodiment, the query optimiser is further adapted to provide the modified query in said order of sub-queries of the second set such that the sub-query having the greatest RR value of all is executed first, the sub-query having the next greatest RR value is executed next, and so forth.

BRIEF DESCRIPTION OF DRAWINGS

The invention will now be described in more detail by means of exemplary embodiments and with reference to the accompanying drawings, in which:

FIG. 4 is an illustration of collecting statistics for a particular unique predicate.

FIG. 5 is an exemplary table with collected statistics for different unique predicates.

DETAILED DESCRIPTION

A piece of information being stored in an RDF-based semantic database is expressed as a statement in the form of a triplet comprising a "subject", a "predicate" and an "object". Basically, the subject identifies the entity that the statement concerns, the predicate identifies a property or characteristic of the subject that the statement specifies, and the object identifies some "value" or range of that property. In other words, the predicate in a stored triplet provides a relation between the subject and the object of that triplet. One simple exemplary information triplet expressing a statement is: "Person X (subject) is a member (predicate) of Enterprise Z (object)", where both Person X and Enterprise Z are resources that are interrelated by the triplet above.

In semantic RDF databases, each element of the statement triplet may be annotated as an element identifier such as a URI (Unified Resource Identifier) in HTTP (Hypertext Transfer Protocol) format or alternatively as a literal name or the like. A typical statement stored in a database may thus be represented by a triplet of element identifiers such as (URI"X", URI"Y", URI"Z"). By representing different statements in a database with such triplet of element identifiers, the content of the database can be annotated in a machine-readable format to enable automatic analysis and processing of the information therein by means of software applications. The semantic RDF database model is thus distinctly different from the conventional relational database model.

The semantic annotation of the content in a database can further be represented in the form of ontologies of statements regarding resources, which will be explained by means of a simple example below. Generally, "ontology" is a topic dealing with how entities or resources can be described in terms of properties. In the context of semantic databases, an ontology is a framework of triplets including predefined resource classes of subjects and objects which are linked by the predicates, and this ontology can be seen as a template which can be filled with information on specific individual resources, also referred to as instances. An illustrative RDF graph can be made with nodes representing the classes, which can be either subjects or objects in the statement, and the nodes are interconnected by properties representing some linking description or characteristic, i.e. the predicates. This type of information is thus annotated in the semantic database as ontologies by the above triplets of element identifiers.

Figure 1:
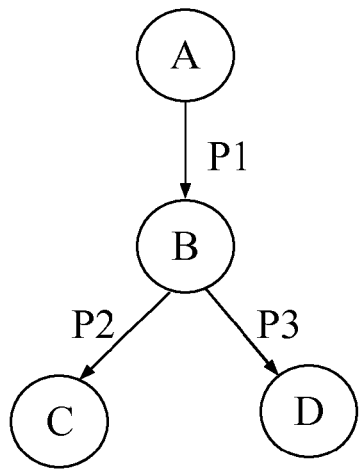
FIG. 1 is a schematic diagram illustrating an exemplary ontology framework in a semantic database, according to the prior art.

FIG. 1 illustrates a simplified exemplary RDF ontology graph forming a framework with four nodes A-D where resource class A relates to resource class B by the linking property or predicate P1, and class B in turn relates to class C by the linking property or predicate P2 and further to class D by the linking property or predicate P3. The ontology graph shown in FIG. 1 is thus basically a framework with three triplet (A,P1,B), (B,P2,C) and (B,P3,D) in which element identifiers such as URIs can be stored for individual instances, as described above. Thus, each resource A-D and predicate P1-P3 is annotated by a respective element identifier or URI, as described above, in a "machine-readable" manner. Alternatively, a URL (Unified Resource locator) or a URN (Unified Resource Name) can be used in an HTTP format for the above annotation.

A query language called "SPARQL", a recursive acronym that stands for "SPARQL Protocol and RDF Query language", has also been developed for database queries in RDF-based semantic databases, which is currently an official W3C (World Wide Web Consortium) recommendation. SPARQL allows users to write globally intelligible queries in the above triplet format that can be processed in multiple heterogeneous databases. SPARQL can generally be used to define queries on a high semantic level. A SPARQL query typically comprises a set of triplet forming conditions for the query which can be formulated by means of the so-called "where clause", which is well-known in this field. These conditional triplet can be regarded as a set of sub-queries which are executed one by one in the database search.

Briefly described, a solution is provided in a server configured to handle database queries directed to a semantic database in which information is stored in the above-described triplet format and according to a known ontology structure. In this description, the term "semantic database" is used to represent, without limitation, any number of internal, external and/or distributed semantic databases that can be accessed according to the procedures and embodiments described herein. Further, the term "query server" when used below should be understood as any server or functional entity that is configured to handle incoming database queries and operate according to any of the embodiments described below.

An incoming database query can be defined as a first set of sub-queries in triplet form with variables, forming an original search path of nodes/subclasses and may be in the above-described SPARQL format. In conventional search procedures, an incoming SPARQL query with a set of sub-queries thus forms a search path and the sub-queries are executed one by one basically in the order given in the query, often resulting in excessive search costs since this combination and order of sub-queries is typically not very efficient in terms of search space required for the search.

In this solution, however, the data set stored in the semantic database is analysed in a "configuring" phase in order to define, or find, semantic rules relating to conclusions that are implied in a logic sense by the information in the database. In other words, such semantic rules can be inferred from the information stored in the database. For example, if no films by a particular producer, e.g. Disney, can be found in a "horror" genre, a semantic rule can be defined basically saying "No films by Disney exist in the horror genre" and the object variable "Genre" is thus devoid of instances when Disney is the subject. In another example, the data set may imply that all documentary movies are produced by BBC. A new semantic rule can then be defined saying that "All movies with genre documentary have provider BBC". When an incoming query contains a sub-query specifying the movie genre is "documentary", we only need to search for movies that are produced by "BBC".

Further, statistics on the stored data is also collected in the configuring phase, including counting how many individual, i.e. distinct, subjects and objects appear in different triplet in the database. The outcome of this configuring phase of finding semantic rules and collecting statistics is then utilised to handle an incoming search query in an efficient manner to reduce the search cost by modifying and improving the search query as follows. It should be noted that the activities of the configuring phase may continue in the background as data is added and removed in the database, to keep the above statistics and semantic rules up-to-date.

Then, in a "run-time" phase of this solution, an incoming query forming a first set of sub-queries can be analysed and rewritten as a second set of sub-queries in the triplet form, preferably according to SPARQL based on the above collection of statistics and defined semantic rules, and also using the known ontology structure, in order to improve and optimise the search path with respect to processing time and cost. The second set of sub-queries thus forms a modified and hopefully improved query in terms of reducing the search space as early in the search as possible.

For example, the ontology structure in the database may provide plural alternative paths from one node/subclass to another node/subclass, and the search path implied by the first set of sub-queries in the incoming query may be substituted by an equivalent search path involving fewer nodes or different nodes with fewer instances than in the original search path of the incoming query. In that case, the incoming query can be rewritten as a second set of sub-queries forming a shorter search path and/or a search path with fewer instances in its nodes to search. In another example, the previously defined semantic rules may suggest that a node in the original search path of the incoming query is devoid of instances and this node can therefore be omitted, or skipped, in the new search path.

Then, a Reduction Rate "RR" is calculated for each of the sub-queries in the second set of sub-queries, based on the statistics collected and analysed in the preceding configuration phase. The statistics may be collected and analysed on a more or less continuous basis, that is to keep the statistics up-to-date with data being added, modified and removed in the semantic database.

Figure 2:
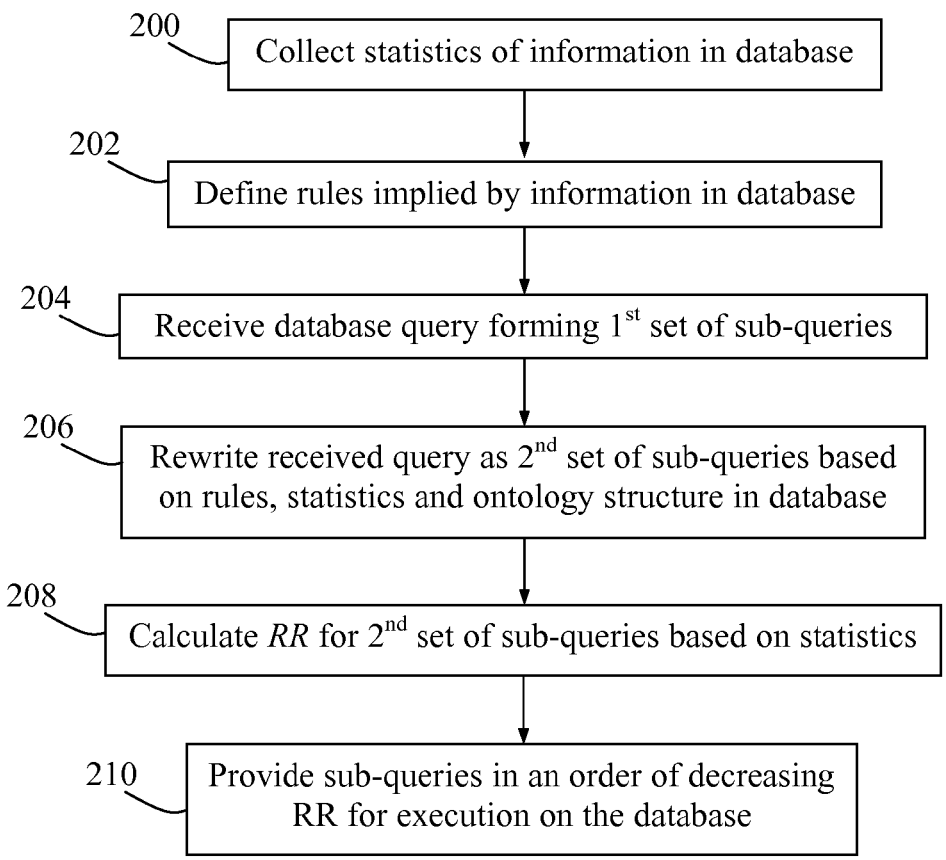
FIG. 2 is a flow chart illustrating a procedure in a server, according to an exemplary embodiment.

A procedure for handling database queries will now be described with reference to FIG. 2, the database queries being directed to a semantic database with a data set of stored information annotated as element identifiers comprising triplet with a subject, a predicate and an object. The information has thus been stored according to a known preset ontology structure in a conventional manner. The procedure in FIG. 2 is executed by a query server that may include or be otherwise associated with a semantic database, although the invention is not limited in this respect. The query server may thus be operative to execute the modified search on the database or to provide the search to a separate search engine or the like which could be situated in a remote location, e.g. in a different country. An example of the configuring phase will be described in more detail later with reference to FIG. 6 and an example of the run-time phase will be described in more detail later with reference to FIG. 9, while the basic procedure in FIG. 2 covers both the configuring phase and the run-time phase.

In a first action 200, the server generally collects statistics derived from the information being currently stored in the database in the above triplet form by analysing the stored triplet. In particular, it is determined how many distinct subjects S and how many distinct objects O appear as variables in triplet with a certain predicate P, which is made for all unique predicates appearing in the database. In practice, this information can be obtained by executing a query with unknown subject and object for each known predicate Pm, i.e. a query with subject and object variables in the form of a triplet "?S-Pm-?O". A more detailed example of how action 200 can be performed will be provided below when describing FIG. 6.

Assuming there are M unique predicates appearing in triplet in the database, the predicates can be denoted P1, P2, ... PM. For example, in a data set with information on movies, one predicate may be "hasGenre" indicating the genre of a movie, and another may be "hasProvider" indicating the provider or producer of a movie. For each unique predicate P, the entire database is searched to find the total number of distinct subjects and objects currently appearing together with that predicate P in the database. Thus, the number $N_S^P$ of distinct subjects S appearing with predicate P and the number $N_O^P$ of distinct object O appearing in triplets with the predicate P are determined during the collection of statistics. This information may be stored in a statistics table or the like for later use in the query improvement process.

In a further action 202, the server defines semantic rules relating to conclusions implied by the information in the database, i.e. rules that can be derived logically from the stored triplet in the database for later use in the query improvement process. As exemplified above, these rules may refer to certain triplet in the preset ontology structure with nodes in the ontology structure being devoid of instances for this data set. Any sub-queries involving these triplet can therefore be omitted when forming a new modified search path for an incoming query, i.e. the above-described second set of sub-queries.

Actions 200 and 202 basically conclude the configuring phase of this solution, although these actions may be further performed on a more or less continuous basis throughout the inventive process while the information in the data set is changed from time to time, to keep the statistics and semantic rules up-to-date. At some point, the server receives a database query in the run-time phase, as indicated by a next action 204. The received database query has typically been made by a user, or generally a "querying party" which could also be some computer-controlled application, and the received query has been defined such that a first set of sub-queries can be identified therefrom. The received database query may have a format according to SPARQL although the invention is not limited to this query format. Further, the sub-queries of the first set are typically defined in terms of "SELECT-WHERE" clauses, which is well known in this field.

The query server then rewrites the first set of sub-queries of the received database query, in a further action 206, by finding a second set of sub-queries in the triplet format based on at least one of: the known ontology structure in the database, the collected statistics and the above defined semantic rules. Firstly, the ontology structure may imply that the search path defined by the first set of sub-queries can be shortened, still starting and ending on the same nodes. As mentioned above, there may be plural alternative paths from a particular start node/subclass to a particular end node/subclass. Secondly, the above defined semantic rules may imply that certain sub-queries in the first set have nodes being devoid of instances, which would thus produce a null result and can therefore be omitted in the search path as explained above. Thirdly, the collected statistics is used to determine a modified order of executing the sub-queries according to the following action. The sub-queries of the second set may likewise be defined in terms of "SELECT-WHERE" clauses.

Having found the sub-queries to form second set which is basically equivalent to the received first set of sub-queries but provides a more efficient search path, the query server will now determine in which order or sequence the sub-queries in the second set should be executed to provide a modified search which has hopefully been improved in terms of reducing the search space as early in the search as possible. It is thus recognised in this solution that for each sub-query it is most efficient to obtain a minimal amount of search results, thus reducing the search space for the next sub-query. It is therefore determined in the following actions which sub-queries can reduce the resulting search space the most in order to place the most efficient search space reducing sub-queries at the beginning of the execution order.

In a triple query pattern, either the subject or the object or both can be provided as variables. In a further shown action 208, the query server calculates the Reduction Rate RR for the sub-queries of the second set based on the collected statistics. Preferably, an RR value is calculated for each sub-query in the second set and these RR values are then used to determine the more efficient and modified order of executing the sub-queries in the search. The RR parameter thus relates to the number of distinct subjects and objects appearing in triplet in the database with the predicate provided in the sub-query, according to the collected statistics.

In this action, the Reduction Rate RR can be calculated for a specific sub-query of the second set with a predicate Pm as:

$$RR_{P_m} = \frac{MUB(V_s)}{N_S^{P_m}} \frac{MUB(V_o)}{N_O^{P_m}} \quad (1)$$

In the above expression (1), $MUB(V_S)$ is a parameter called "Minimum Upper Bound" for a subject variable $V_S$ in the sub-query, $MUB(V_O)$ is a Minimum Upper Bound for an object variable $V_O$ in the sub-query, $N_S^{Pm}$ is the number of distinct subjects S appearing in triplet with the predicate Pm, and $N_O^{Pm}$ is the number of distinct objects O appearing in triplet with the predicate Pm. In this way, an RR value can thus be calculated for each sub-query in the second set.

In more detail, in order to calculate the RR value according to expression (1) above, the $MUB(V_S)$ value of the subject variable $V_S$ is first determined as the minimum value of the statistics collected for variable $V_S$ and the $MUB(V_O)$ value of the object variable $V_O$ is likewise determined as the minimum value of the statistics collected for the object variable $V_O$.

The MUB value is determined in this way for all variables appearing in the sub-queries of the second set, regardless of whether they appear as subjects or objects or both. In order to facilitate the following processing, the sub-queries of the second set may be divided into groups having a common variable, which is however somewhat outside the scope of this solution.

In a last shown action 210, the query server finally provides the sub-queries of the second set as a modified query basically in an order according to decreasing RR values of the sub-queries, for execution basically in that order when searching the database. In other words, the sub-query having the greatest RR value of all will be executed first, the sub-query having the next greatest RR value will be executed next, and so forth. Of course, some sub-queries in the second set may have the same RR value and the relative order of those sub-queries may be selected freely. Further, the benefits of this solution can be achieved when the sub-queries of the second set are provided in an order at least partly according to the decreasing Reduction Rates of the sub-queries. Thereby, the sub-queries in the second set can be executed in a more efficient manner such that the search space can be reduced as much as possible early in the succession of sub-queries which thus provides for a most efficient search in terms of processing time and search cost, particularly since the total amount of data to search will be minimised.

In FIG. 3, a server 300 is illustrated when in operation according to this solution to handle and process a received search query directed to a semantic database 302, by turning the received query into a modified query basically in the manner described above. The semantic database 302 thus contains stored information according to a known preset ontology structure and annotated as element identifiers comprising triplet with a subject, a predicate and an object. As in the example described above, the server 300 may be operative to itself execute the modified search on the database 302, or to provide the modified search to a separate search engine, not shown, that will execute the search.

The server 300 comprises a data analyser 300a adapted to collect statistics derived from the information in the database, and to define semantic rules relating to conclusions implied by the information in the database, basically as described above for actions 200 and 202 of the configuring phase of this solution. The server 300 also comprises a communication module 300b adapted to receive, in the run-time phase, a database query forming a first set of sub-queries.

The server 300 further comprises a query optimiser 300c adapted to rewrite the received database query as a second set of sub-queries in the triplet format based on at least one of the structure of the ontologies, the collected statistics and the defined rules. The query optimiser 300c is further adapted to calculate the above-described Reduction Rate RR for the sub-queries in the second set based on the statistics collected in the data analyser, basically as described above for action 208. The Reduction Rate thus relates to the number of distinct subjects and objects appearing in triplet in the database with predicates corresponding to the sub-queries. The query optimiser 300c is also adapted to provide the sub-queries of the second set as a modified query in an order according to decreasing Reduction Rates of the sub-queries, for execution in that order when searching the database, basically as described above for action 210.

Depending on the implementation, The server 300 may further comprise a search module 300d adapted to perform a search by executing the modified query with the sub-queries of the second set, on the database, the query thus being provided from the query optimiser 300c. In that case, the communication module 300b may be further adapted to return a response with results from the search. This scenario is schematically indicated in the figure by dashed arrows. Otherwise, the communication module 300b may send the modified query, as provided from the query optimiser 300c, to an external search engine or the like, not shown, for execution on the database 302.

It should be noted that FIG. 3 merely illustrates various functional modules or units in the server 300 in a logical sense, although the skilled person is free to implement these functions in practice using suitable software and hardware means. Thus, the invention is generally not limited to the shown structures of the server 300, while its functional modules 300a-d may be configured to operate according to the procedure described for FIG. 2 above, where appropriate.

Figure 3A:
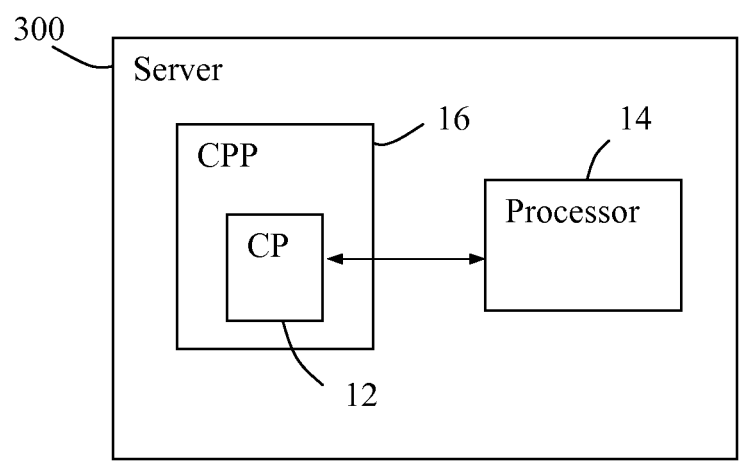
FIG. 3 is a block diagram illustrating a server in more detail when in operation, according to further exemplary embodiments.

With reference to FIG. 3 and the block diagram of FIG. 3a, the functional modules 300a-e described above can be implemented in the server 300 as program modules of a computer program CP 12 comprising code means which when run by a processor 14 in the server 300 causes the server 300 to perform the above-described functions and actions. The processor 14 may be a single CPU (Central processing unit), or could comprise two or more processing units in the server 300. For example, the processor 14 may include general purpose microprocessors, instruction set processors and/or related chips sets and/or special purpose microprocessors such as ASICs (Application Specific Integrated Circuit). The processor may also comprise board memory for caching purposes.

The computer program 12 may be carried by a computer program product CPP 16 in the server 300 connected to the processor 14. The computer program product 16 comprises a computer readable medium on which the computer program 12 is stored. For example, the computer program product 16 may be a flash memory, a RAM (Random-access memory), a ROM (Read-Only Memory) or an EEPROM (Electrically Erasable Programmable ROM), and the program modules could in alternative embodiments be distributed on different computer program product in the form of memories within the server 300.

As mentioned above, collecting statistics from the database in the configuring phase may be performed in practice by executing a predefined query with unknown subject and object for each known predicate Pm. This predefined "statistics collecting query" can be configured as a triplet "?S-Pm-?O" with both subject and object as variables, that will provide a search result when executed on the database from which it can be determined how many distinct subjects and objects appear in the database in any triplet having the predicate Pm. As schematically illustrated in FIG. 4, in this process, the total number $N_S^{Pm}$ of distinct subjects S appearing in triplet with a specific predicate Pm is determined and the total number $N_O^{Pm}$ of distinct objects O appearing in triplet with the predicate Pm is determined as well.

As mentioned above, if there are M known predicates appearing in the database, this search is executed basically for all predicates P1, P2 . . . PM. This information may be stored in a statistics table or the like for later use in the query improvement process. An exemplary statistics table for entering the above values $N_S^{Pm}$ and $N_O^{Pm}$ for each known predicate Pm is depicted in FIG. 5.

A more detailed exemplary procedure of collecting statistics from a semantic database in a statistics table such as the one shown in FIG. 5, will now be described with reference to the flow chart in FIG. 6. In a first shown action 600, specific "statistics collecting queries" with unique predicates are defined for collecting statistics in the database. For example, if M unique predicates have been identified as appearing in the database, these queries may be defined as triplet with both subject and object being variables, basically in the form of "?S-Pm-?O" where m=1, 2, 3 . . . M in the different queries.

A next action 602 illustrates that a first predefined query valid for a first known predicate P1, is executed on the database. Then, the number $N_S^{P1}$ of distinct subjects stored with predicate P1 of the query is determined from the search results in an action 604. Likewise, the number $N_O^{P1}$ of distinct objects stored with predicate P1 of the query is also determined in a further action 606. In a following action 608, the statistics table is updated by entering the determined values $N_S^{P1}$ and $N_O^{P1}$ for predicate P1, basically the first row of the table in FIG. 5.

A further action 610 illustrates that the next predefined query valid for the next known predicate P2 is taken for executing the next query on the database, thus repeating actions 602-608 for obtaining statistics for the new query and the next row in the table in FIG. 5 can be populated with the determined values. This process according to actions 602-608 is thus repeated until all the predefined statistics collecting queries have been executed for all known predicates P1, P2 . . . PM. However, this solution does not exclude the possibility of omitting a statistics collecting query for any of the predicates P1, P2 . . . PM, e.g. if that omitted predicate is of minor interest.

Above, it has been described in detail how the reduction rate RR can be calculated in the run-time phase for sub-queries of the second set of an incoming database query, using the expression (1). This expression contains the above-determined parameters $N_S^{P1}$ and $N_O^{P1}$ which are available from the table in FIG. 5 for each unique predicate Pm appearing in the sub-queries of the second set.

Figures 8, 9:
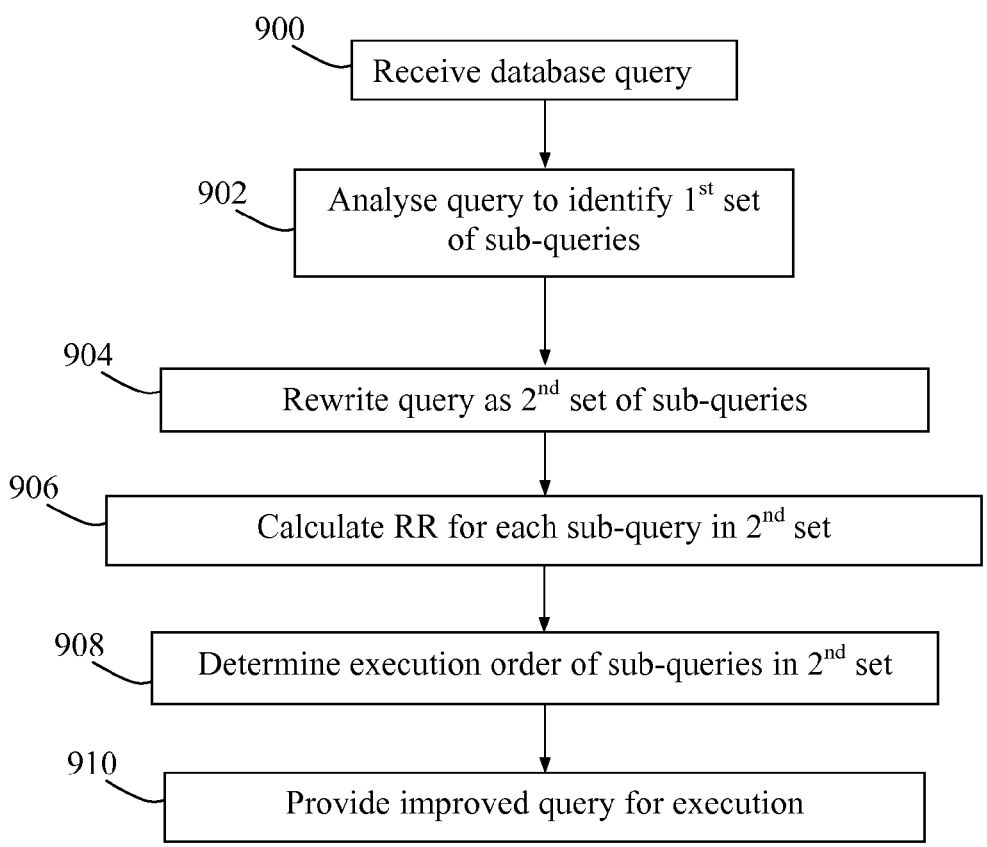
FIG. 8 is an exemplary table with calculated MUB values for the variables appearing in the table of FIG. 7.
FIG. 9 is a flow chart illustrating in more detail a process in the server for improving a query, according to an exemplary embodiment.

Expression (1) further contains the parameter $MUB(V_S)$ being determined as the minimum value of the statistics collected for variable $V_S$, and the parameter $MUB(V_O)$ being determined as the minimum value of the statistics collected for the object variable $V_O$. In FIG. 7, an exemplary table of calculated RR values for a set of sub-queries is depicted, and an exemplary table of MUB values determined for different variables from the collected statistics is depicted in FIG. 8.

In this example, a second set of eight sub-queries in total has been defined when rewriting a received database query. The table of FIG. 7 comprises a first column with triplet identities T1-T8, a second column with triplets of the actual sub-queries in the second set, a third column with $N_S^{Pm}$ values retrieved from the statistics table of FIG. 5 for each predicate Pm in the sub-queries, a fourth column with $N_O^{Pm}$ values likewise retrieved from the statistics table of FIG. 5 for each predicate Pm, and a fifth column with the calculated RR values for each sub-query in the table.

For example, for the sub-query of T3 "?A-P3-?C", the number $N_S^{P3}$ of distinct subjects stored with predicate P3 is 2731 and the number $N_O^{P3}$ of distinct objects stored with that predicate P3 is 3675, and so forth. Using this information in the table of FIG. 7, the MUB values can be determined for different variables appearing in the eight sub-queries. As mentioned above, the MUB value for a variable is determined as the minimum value of the statistics collected for that variable.

Figures 6, 7:
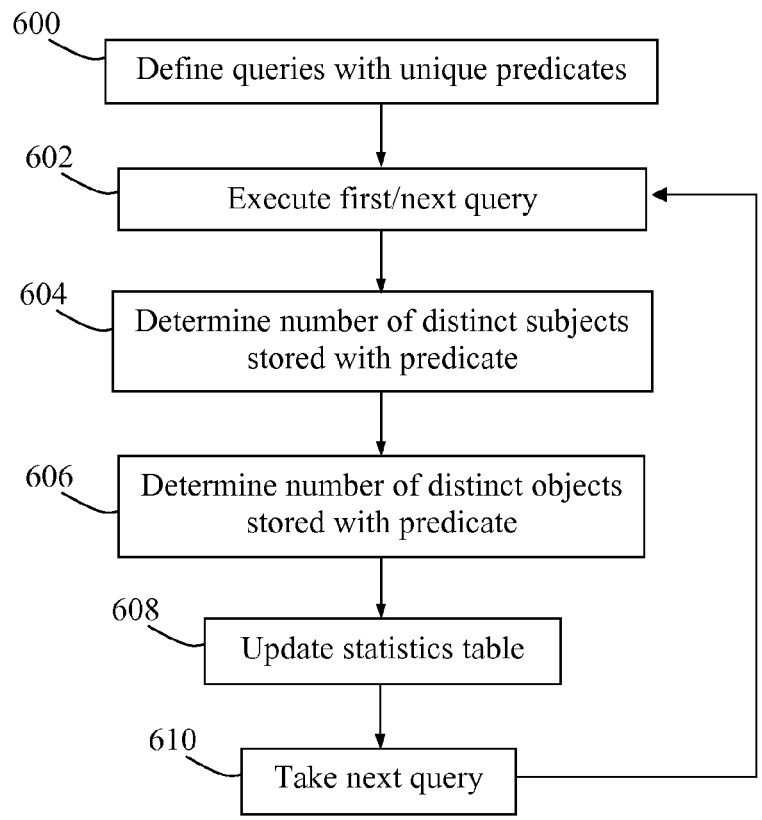
FIG. 6 is a flow chart illustrating in more detail a process in the server for collecting statistics, according to another exemplary embodiment.
FIG. 7 is an exemplary table with collected statistics and calculated RR values for variables and predicates appearing in different sub-queries.

First considering the variable "A" in FIG. 7, it appears in four sub-queries T1, T2, T3 and T6 as either subject (T1-T3) or as object (T6). Of these four sub-queries, the minimum value of either $N_S^{Pm}$ or $N_O^{Pm}$ for variable "A" is in this example 1556 out of the values 1556, 2987, 2731 and 3051 for sub-queries T1, T2, T3 and T6, respectively, which is entered as the MUB value for variable "A" in the table of FIG. 8 as shown. In this way, corresponding MUB values can be determined for the remaining variables G, C, U, . . . appearing in the sub-queries specified in FIG. 7.

Then, these MUB values can be used in expression (1) to calculate the RR values for each sub-query in the table, which may be used to determine the optimal and most efficient order of executing the sub-queries in terms of search cost. As a result, there are in this example actually four sub-queries in the second set having the same RR value of 1, i.e. T1, T4, T5 and T8.

As described above, the sub-query having the greatest RR value of all should be executed first, the sub-query having the next greatest RR value should be executed next, and so forth. Consequently, the optimal order of execution in this example is T1, T4, T5, T8, T7, T3, T2 and finally T6. Therefore, according to this solution, the sub-queries of the second set can be provided basically in this order according to decreasing RR values of the sub-queries, as a modified query for execution in that order when searching the database. As said above, when sub-queries in the second set have the same RR value the relative order of those sub-queries may be selected freely. In this case, the relative order of sub-queries T1, T4, T5 and T8 having the same RR value of 1 can be selected freely without reducing the efficiency of the total query.

A more detailed exemplary procedure of performing improvement of a received database query, will now be described with reference to the flow chart in FIG. 9 basically corresponding to actions 204-210 in FIG. 2. Accordingly, the procedure of FIG. 9 is performed by a server such as the one depicted in FIG. 3. It is also assumed that a configuring phase has been executed basically according to the flow chart of FIG. 6. In a first shown action 900, the database query is received from a querying party and the query is analysed in a next action 902 to identify a first set of sub-queries and their variables forming the received query.

A further action 904 illustrates that the identified first set of sub-queries and their variables are rewritten as a second set of sub-queries and their variables, based on the known ontology structure in the database, the collected statistics and the above defined semantic rules. In a next action 906, the above-described RR parameter is calculated for the sub-queries in the second set based on the collected statistics. Actions 904 and 906 basically corresponds to actions 206 and 208 above, respectively, and are thus not necessary to describe here again.

Then, the server determines an execution order of the sub-queries in the second set according to decreasing RR values of the sub-queries to form a modified query, in a further action 908. A example of how actions 906 and 908 can be put into practice was described in connection with FIGS. 7 and 8. Finally, the modified query is provided for execution on the database. The actual search may be executed by the server, e.g. when having a search module according to FIG. 3, or by an external search engine or the like.

While the invention has been described with reference to specific exemplary embodiments, the description is generally only intended to illustrate the inventive concept and should not be taken as limiting the scope of the invention. The invention is defined by the appended claims.

The invention claimed is:

1. A method implemented by a server for handling a database query directed to a semantic database having information stored according to a preset ontology structure and annotated in a machine-readable format as element identifiers comprising triplets with a subject, predicate, and object, the method comprising:
collecting statistics derived from the information stored in the database, wherein collecting the statistics comprises:
determining a number $N_S^P$ of distinct subjects appearing in triplets with a predicate P;
determining a number $N_O^P$ of distinct objects appearing in triplets with the predicate P;
wherein the determining of $N_S^P$ and $N_O^P$ is performed for individual unique predicates P1, P2, . . . PM appearing in the database;
defining semantic rules relating to conclusions implied by the information stored in the database;
receiving a database query including a first set of sub-queries;
rewriting the received database query as a second set of sub-queries in the triplet format based on at least one of: the ontology structure, the collected statistics, and the defined rules;
calculating a Reduction Rate for the second set of sub-queries based on the collected statistics, wherein the Reduction Rate relates to the numbers of distinct subjects and objects appearing in triplets in the database with predicates provided in the second set of sub-queries; and
providing the second set of sub-queries as a modified query in which the sub-queries of the second set are in an order arranged at least partly according to decreasing Reduction Rate, for execution in that order when searching the database.

2. The method of claim 1, wherein the received database query has a SPARQL format.

3. The method of claim 1, wherein the sub-queries of the first and second sets are defined in terms of "SELECT-WHERE" clauses.

4. The method of claim 1, wherein $N_S^P$ and $N_O^P$ are determined by executing predefined queries with the unique predicates in the database and with variable subjects and objects.

5. The method of claim 1, wherein the Reduction Rate (RR) is calculated for a given sub-query of the second set with a predicate Pm as:

$$RR_{P_m} = \frac{MUB(V_s)}{N_s^{P_m}} \frac{MUB(V_o)}{N_o^{P_m}}$$

where $MUB(V_S)$ is a Minimum Upper Bound for subject variable $V_S$ in the given sub-query; $MUB(V_O)$ is a Minimum Upper Bound for object variable $V_O$ in the given sub-query; $N_S^{Pm}$ is a number of distinct subjects S appearing in triplets with the predicate Pm; and $N_O^{Pm}$ is a number of distinct objects appearing in triplets with the predicate Pm.

6. The method of claim 5:
wherein the Minimum Upper Bound for the subject variable $MUB(V_S)$ is determined as a minimum value of statistics collected for the subject variable;
wherein the Minimum Upper Bound for the object variable $MUB(V_O)$ is determined as a minimum value of statistics collected for the object variable; and
wherein a Minimum Upper Bound is determined for substantially all variables appearing in the sub-queries of the second set.

7. The method of claim 1, wherein the order of sub-queries of the second set in the modified query is entirely arranged according to decreasing Reduction Rate.

8. A server configured to handle a database query directed to a semantic database having information stored according to a preset ontology structure and annotated in a machine-readable format as element identifiers comprising triplets with a subject, predicate and object, wherein the server comprises:
a data analyzer configured to collect statistics derived from the information in the database by being configured to:
collect the statistics by determining a number $N_S^P$ of distinct subjects appearing in triplets with a predicate P;
determine a number $N_O^P$ of distinct objects appearing in triplets with the predicate P;
wherein $N_S^P$ and $N_O^P$ are determined for individual unique predicates P1, P2, . . . PM appearing in the database; and
wherein the data analyser is configured to define semantic rules relating to conclusions implied by the information in the database;
a communication module configured to receive a database query including a first set of sub-queries; and
a query optimizer configured to:
rewrite the received database query as a second set of sub-queries in the triplet format based on at least one of: the ontology structure, the collected statistics, and the defined rules;
calculate a Reduction Rate for the second set of sub-queries based on the statistics collected by the data analyzer, wherein the Reduction Rate relates to the numbers of distinct subjects and objects appearing in triplets in the database with predicates provided in the second set of sub-queries; and
provide the second set of sub-queries as a modified query in which the sub-queries of the second set are in an order arranged at least partly according to decreasing Reduction Rate, for execution in that order when searching the database.

9. The server of claim 8, further comprising:
a search module configured to perform a search by executing the second set of sub-queries in the database;
wherein the communication module is further configured to return a response with results from the search.

10. The server of claim 8, wherein the data analyzer is further configured to determine $N_S^P$ and $N_O^P$ by executing predefined queries with the unique predicates in the database and with variable subjects and objects.

11. The server of claim 8, wherein the query optimizer is further configured to calculate the Reduction Rate (RR) for a given sub-query of the second set with a predicate Pm as:

$$RR_{P_m} = \frac{MUB(V_s)}{N_s^{P_m}} \frac{MUB(V_o)}{N_o^{P_m}}$$

where $MUB(V_S)$ is a Minimum Upper Bound for a subject variable $V_S$ in the given sub-query; $MUB(V_O)$ is a Minimum Upper Bound for object variable $V_O$ in the given sub-query; $N_S^{P_m}$ is the number of distinct subjects S appearing in triplets with the predicate Pm; and $N_O^{P_m}$ is a number of distinct objects O appearing in triplets with the predicate Pm.

12. The server of claim 8, wherein the query optimizer is further configured to: determine the Minimum Upper Bound for the subject variable MUB(Vs) as a minimum value of statistics collected for the subject variable; determine the Minimum Upper Bound for the object variable MUB(Vo) as a minimum value of statistics collected for the object variable; and determine a Minimum Upper Bound for substantially all variables appearing in the sub-queries of the second set.

13. The server of claim 8, wherein the order of sub-queries of the second set in the modified query is entirely arranged according to decreasing Reduction Rate.

* * * * *